(No Model.)

2 Sheets—Sheet 1.

W. P. SMITH.
CORN PLANTER ATTACHMENT.

No. 604,129.

Patented May 17, 1898.

Witnesses:
R. G. Orwig.
E. A. Sayre.

Inventor:
Walter P. Smith,
by Thomas G. and J. R. Orwig
Attys.

(No Model.) 2 Sheets—Sheet 2.

W. P. SMITH.
CORN PLANTER ATTACHMENT.

No. 604,129. Patented May 17, 1898.

Witnesses:
R. G. Orwig.
E. A. Sayre.

Inventor:
Walter P. Smith
by Thomas G. and J. R. Orwig,
Attys.

UNITED STATES PATENT OFFICE.

WALTER P. SMITH, OF CLARKSVILLE, IOWA.

CORN-PLANTER ATTACHMENT.

SPECIFICATION forming part of Letters Patent No. 604,129, dated May 17, 1898.

Application filed October 28, 1897. Serial No. 656,718. (No model.)

*To all whom it may concern:*

Be it known that I, WALTER P. SMITH, a citizen of the United States, residing at Clarksville, in the county of Butler and State of Iowa, have invented a new and useful Corn-Planter Attachment, of which the following is a specification.

The object of this invention is to provide a device in the nature of an attachment that may be applied to any of the ordinary check-row corn-planters and which will be automatically operated by the check-rowing mechanism to drop a certain number of pumpkin-seeds or the like in each alternate row and at distances of separation corresponding to any certain predetermined number of hills of corn, and, further, to provide means whereby this auxiliary seed-dropping mechanism may be thrown in or out of gear at will.

My invention consists in certain details in the construction, arrangement, and combination of the pumpkin-seed-dropping mechanism and in the arrangement and combination thereof with the ordinary check-rowing mechanism of the corn-planter, as hereinafter more fully set forth, pointed out in my claims, and illustrated in the accompanying drawings, in which—

Figure 1:
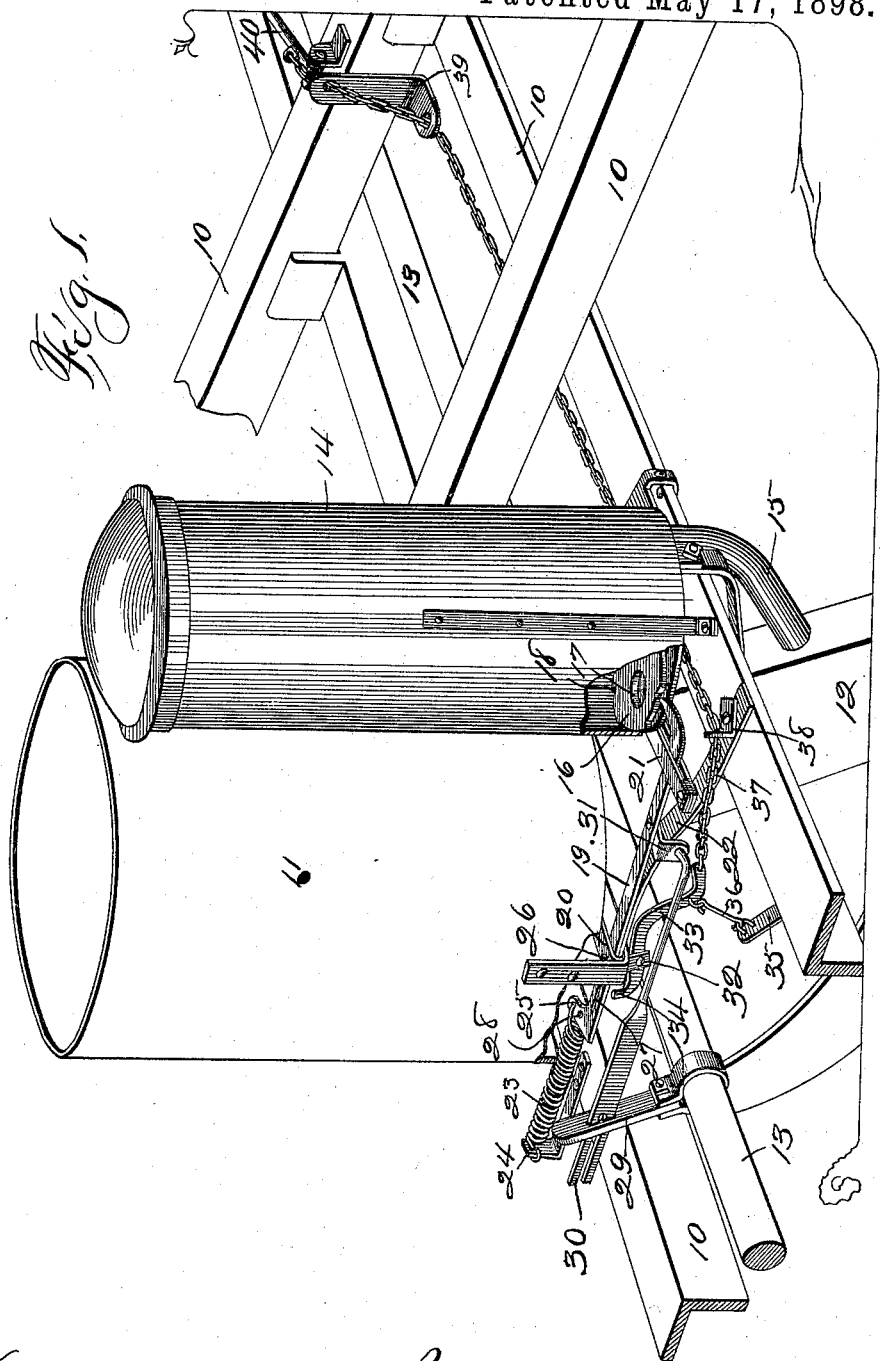
Figure 2:
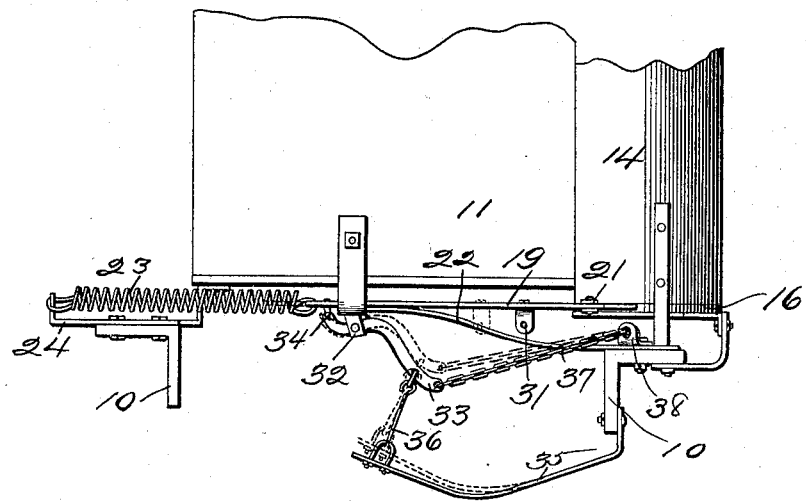
Figure 3:
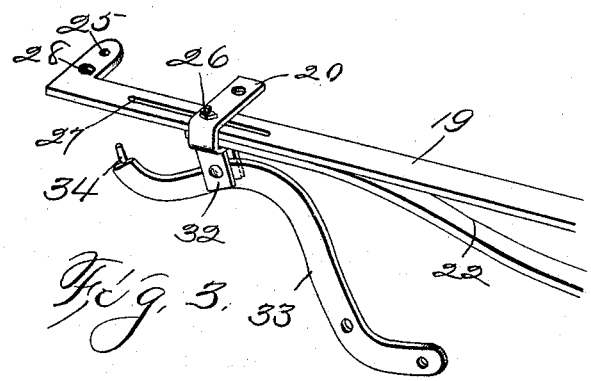

Figure 1 shows a detail perspective view of a portion of a corn-planter and one of the seed-holding hoppers thereon, and also my pumpkin-seed-dropping attachment applied thereto, portions of both seedboxes being broken away to show certain details of construction. Fig. 2 shows a detail view, in side elevation, of one of the corn-holding hoppers, and also the pumpkin-seed box and parts of the operating mechanism of my attachment connected therewith, and also by dotted lines showing the position that the locking device would assume when in position for the pumpkin-seed-dropping mechanism to operate. Fig. 3 shows a detail perspective view of the lever that serves as a locking device.

Referring to the accompanying drawings, the reference-numeral 10 is used to indicate that portion of the corn-planter frame shown.

11 indicates the corn-containing hopper, and 12 the leg of the runner, leading from the corn-containing hopper to the runner.

13 indicates a rock-shaft mounted in the machine-frame and arranged to be operated by the check-rowing mechanism, to thereby cause a certain number of grains of corn to be dropped each time it is rocked.

The parts just described are all of the ordinary construction and a detail description of their operation and construction is deemed unnecessary.

The pumpkin-seed-dropping attachment comprises a seedbox 14, fixed to the machine-frame adjacent to one of the corn-seed boxes and having a tube 15 leading from an opening in its bottom to the runner-leg 12, so that seed dropping therefrom will be commingled with the seed dropped from the corn-box. In the bottom of the hopper 14 is a disk or valve 16, having one or more openings 17 therein, and in the periphery of this disk is a series of notches 18. Mechanism (which will be hereinafter described) is provided whereby this disk 16 is moved a distance corresponding to the length of one of the notches in its periphery each time that the corn-dropping mechanism is actuated, and it is obvious that when a certain predetermined number of operations of the corn-dropping mechanism have been completed the opening 17 will assume a position in alinement with the tube 15 and thereby drop the seeds contained in the said opening into the said tube. It is to be understood that the usual means are provided in the hopper 14 for preventing the seeds from passing through the openings 17 in too great numbers when in alinement with the tube 15. Any of the ordinary devices for this purpose now commonly used in corn-planting machinery may be used in this connection.

The reference-numeral 19 is used to indicate a ratchet-bar mounted for longitudinal movement within the brackets 20, 21, and 22. One end of this ratchet-bar 19 is curved and pointed to engage with the notched periphery of the disk 16.

The reference-numeral 23 is used to indicate a contractile coil-spring fixed at one end to a bracket 24, that is secured to the machine-frame, and at its other end to an arm 25 formed on the end of the ratchet-bar 19 to normally hold the ratchet-bar to the forward limit of its movement. The movement of the said ratchet-bar is limited by means of a bolt 26, passed downwardly through the brackets 20 and 22 and through the longitudinal slot 27 formed in the ratchet-bar. An opening 28 is formed in the forward end of the ratchet-bar 19 for purposes hereinafter made clear.

I have provided means for moving the ratchet-bar 19 rearwardly simultaneously with the movement of the rock-shaft 13, as follows: 29 indicates an arm clamped to the rock-shaft 13 and projecting upwardly therefrom. In this arm are two openings designed to slidingly admit the bifurcated end of a rod 30. This rod 30 projects rearwardly therefrom and is connected with a lug 31, which in turn is fixed to the ratchet-bar 19. It is obvious that when the arm 29 is moved rearwardly from the position shown in Fig. 1 by the rocking of the shaft 13 the ratchet-bar 19 will be forced rearwardly, to thereby actuate the disk 16, and then when the arm 29 is moved forwardly by the shaft 13 the spring 23 will draw the ratchet-bar and bar 30 forwardly. However, should the bar 19 be locked in its rearwardly-extended position it is obvious that the bifurcated end of the bar 30 will slide in the openings in the arm 29 without operating the bar 19. I have provided means for locking the said bar 19 when at its rearward limit to prevent the operation of the pumpkin-seed-dropping mechanism, as follows:

32 indicates a forked bracket formed on or fixed to the lower end of the bolt 26, and 33 indicates a curved lever fulcrumed in this bracket 32. On one end of this lever 33 is a projection 34, that is designed to enter the opening 28 in the ratchet-bar 19 when the rear end of the lever 33 is moved downwardly. 35 indicates a leaf-spring fixed at one end to the frame. 36 indicates a link connecting the forward end of this spring 35 with the rear end of the lever 33 and tending to hold the said rear end to its downward limit.

37 indicates a chain fixed to the rear end of the lever 33 and passed through the guides 38 and 39 and attached to a lever 40, which lever is fulcrumed to a portion of the frame at a point beyond the point of attachment of the said chain. It is obvious that, when this lever is thrown to the position opposite from that shown in Fig. 1 the said chain will be drawn tight and the spring 35 pulled upwardly, to thereby hold the projecting end 34 of the lever 33 downward. It is obvious that when the lever 40 is moved in a position to slacken the chain the spring 35 will force the rear end of the lever 33 downwardly, and thus bring the projecting end 34 of the lever in position to enter the opening 28, and thus throw the pumpkin-seed-dropping mechanism out of gear.

In practical use it is obvious that when the attachment is applied to a corn-planter the ratchet-bar 19 will be operated each time that the corn-dropping mechanism is operated. However, the disk 16 of the pumpkin-seed-operating mechanism will be moved only the distance of one of the notches on its periphery each time that the corn-dropping mechanism is operated, and hence the pumpkin-seeds will be dropped only at certain intervals corresponding to the number of notches on the periphery of the disk 16. When it is desired to throw the pumpkin-seed-dropping mechanism out of gear, it is only necessary to operate the lever 40, whereupon the locking mechanism will prevent a further operation of the ratcheted lever 19.

Having thus described my invention, what I claim as new therein, and desire to secure by Letters Patent of the United States therefor, is—

1. A pumpkin-seed-dropping attachment for check-row corn-planters, comprising in combination, a hopper designed to be secured to the machine-frame, a tube connecting the hopper with the runner of the corn-planter, a seed-dropping valve in the pumpkin-seed holder having a notched disk, a ratchet-bar slidingly mounted and arranged to engage the said notched disk, means for connecting the rock-shaft of the corn-planter with the said ratchet-bar in such a manner as to cause the ratchet-bar to move the said disk one notch-space each time that said rock-shaft is operated so that when the said ratchet-bar has been moved a certain predetermined number of times the pumpkin-seed-dropping valve will be operated, and means for locking the said ratchet-bar, for the purposes stated.

2. A pumpkin-seed-dropping attachment for check-row corn-planters, comprising in combination, a hopper designed to be attached to the machine-frame, a tube connecting the hopper with the hollow leg of the planter, a seed-dropping valve having a disk with a ratcheted periphery, a ratchet-bar slidingly mounted, a spring for normally holding the ratchet-bar to its forward limit, means for limiting the movement of the ratchet-bar, said ratchet-bar having an opening therein, an arm clamped to the rock-shaft of the corn-dropping mechanism and having two openings therein, a bar having a bifurcated end inserted in the said openings and connected with the ratchet-bar at its other end, a curved lever fulcrumed beneath the ratchet-bar and having a projecting end that is designed to enter the said opening in the ratchet-bar, a spring for holding the rear end of the lever downwardly so that the said projecting end of the lever will enter the said opening, and means for holding the rear end of the said lever elevated against the resiliency of the said spring, all arranged and combined substantially in the manner set forth and for the purposes stated.

3. A pumpkin-seed-dropping attachment for check-row corn-planters, comprising in combination, a seed-containing hopper designed to be attached to a corn-planter, a valve therein, having a ratcheted periphery, a tube for connecting the said hopper with the hollow leg of the planter, a ratchet-bar slidingly mounted to engage the said ratcheted disk, means for limiting the movement of the said ratchet-bar, a spring for normally holding the said ratchet-bar to its forward limit of movement, an arm clamped to the rock-shaft of the said dropping mechanism of the planter, and a bar connecting this arm with the said ratchet-bar, substantially as and for the purposes stated.

WALTER P. SMITH.

Witnesses:
C. H. ILGENFUTZ,
E. G. CHAPIN.